(Model.)
2 Sheets—Sheet 1.
J. DOYLE.
Chuck.
No. 237,731.     Patented Feb. 15, 1881.
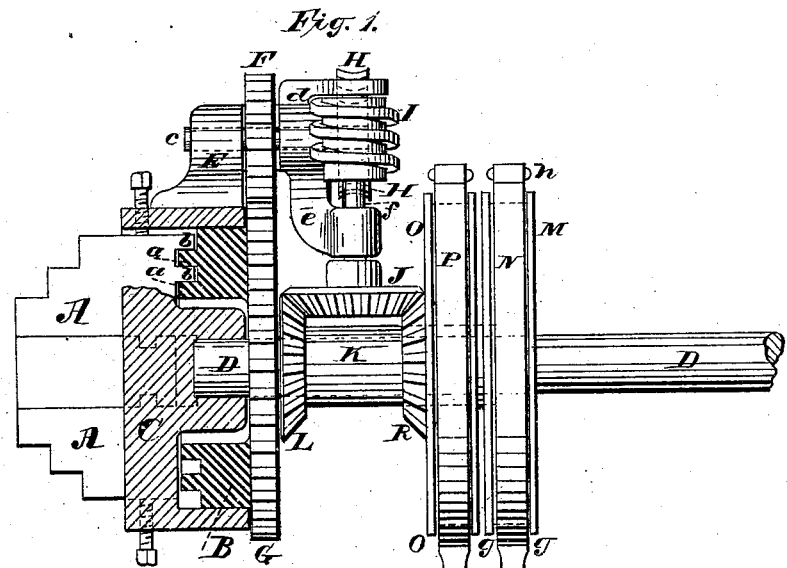
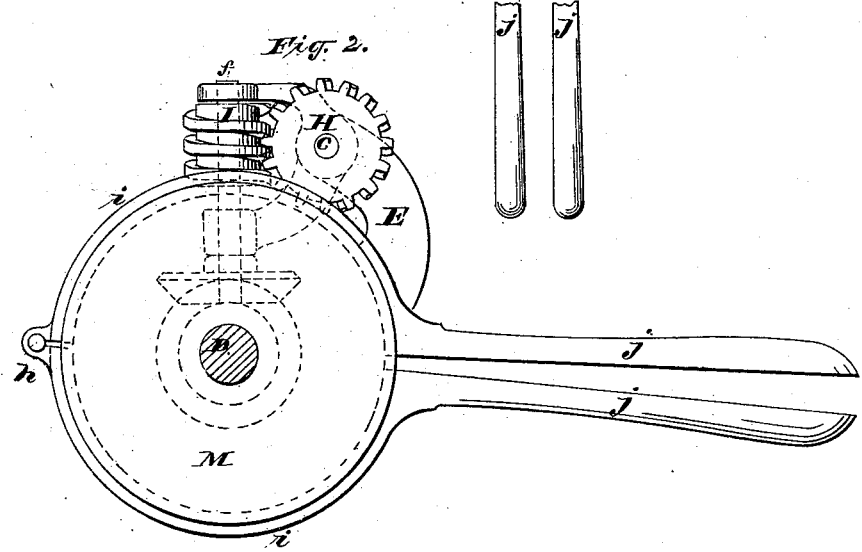
WITNESSES.
H. F. Parker
R. H. Griffin
INVENTOR.
John Doyle.
per James A. Whitney
ATTY.

(Model.)
2 Sheets—Sheet 2.
J. DOYLE.
Chuck.
No. 237,731.                     Patented Feb. 15, 1881.
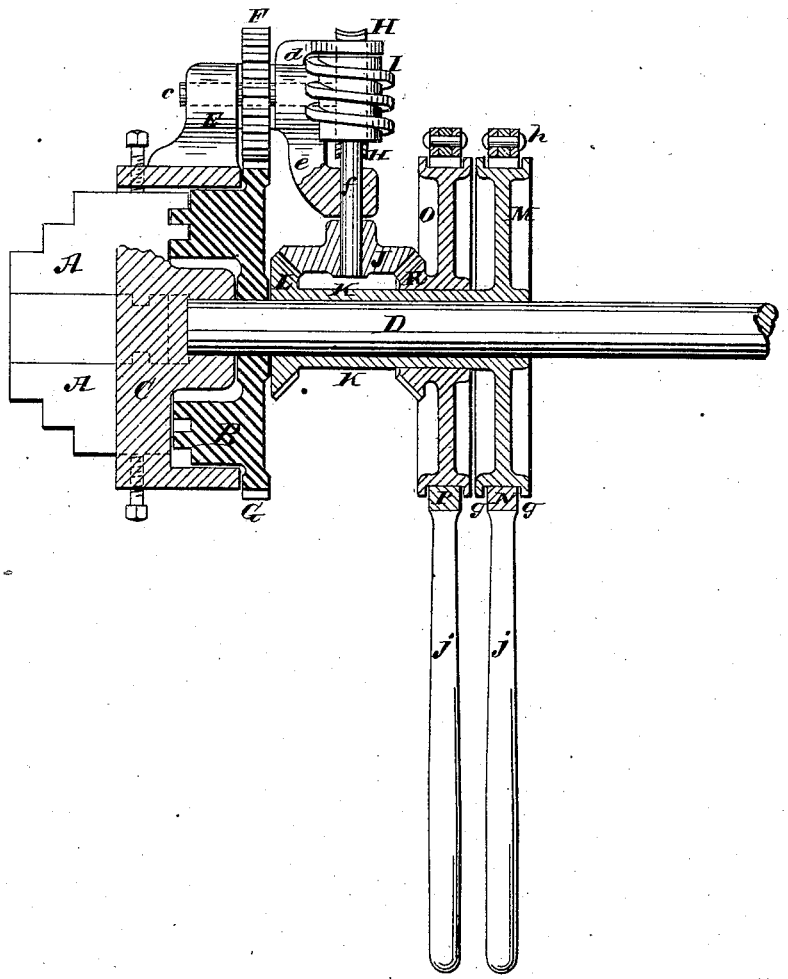
WITNESSES.
H. F. Parker.
R. H. Griffin
INVENTOR.
John Doyle.
Per- James A. Whitney.
Att'y.

UNITED STATES PATENT OFFICE.

JOHN DOYLE, OF HOBOKEN, NEW JERSEY.

CHUCK.

SPECIFICATION forming part of Letters Patent No. 237,731, dated February 15, 1881.

Application filed June 14, 1880. (Model.)

*To all whom it may concern:*

Be it known that I, JOHN DOYLE, of Hoboken, in the county of Hudson, State of New Jersey, have invented certain Improvements in Chucks, of which the following is a specification.

The object of this invention is to provide a chuck the jaws of which may be expanded or contracted, as occasion may require, during the use of the chuck without involving the necessity of stopping the rotation thereof.

The invention comprises certain novel combinations of parts whereby said object is effectually secured.

Figure 1 is a side view and partial sectional view, Fig. 2 an end view, and Fig. 3 a longitudinal sectional view, of a chuck embracing the said invention.

The jaws A are preferably three in number, and capable of a simultaneous radial movement to and from the axial line of motion of the chuck. The said jaws are connected with the head B in the usual manner, the head B having upon its face spiral ribs $a$, which interlock with projections $b$ on the inner ends of the jaws A, the said jaws A being, of course, fitted into radial guides provided in the front of the frame or face-plate C of the chuck. Inasmuch as the aforesaid parts A B C are of the usual construction and are placed in the usual relation with each other, they need no special or further description here. The frame C is, of course, attached to and carried by the driver-shaft D.

Extending laterally from the frame C is a bracket, E, which affords bearings for a shaft, $c$, which carries a spur-pinion, F, which latter gears into a spur-wheel, G, which is attached to the back of and rotates with the head B. The aforesaid shaft $c$ also carries a worm-wheel, H. The bracket E has arms $d$ and $e$, of suitable form to provide bearings for a shaft, $f$, which carries a worm, I, that gears into the worm-wheel H. The said shaft $f$ also carries a beveled pinion, J.

On the shaft D is a sleeve, K, at the inner end of which is a beveled pinion, L, which gears into the beveled pinion J at one side thereof.

To the outer end of the sleeve K is attached a circular disk, M, which is provided at its opposite circumferential edges with flanges $g$.

Placed on the disk M is a clamp, N, said clamp being composed of two opposite parts pivoted together, as represented at $h$. Each of the two parts aforesaid is composed of a semicircular portion, $i$, and a handle, $j$, the semicircular parts $i$ inclosing the disk M, while the handle $j$ affords a means to tighten the said clamp upon the said disk, or of loosening the gripe of said clamp upon said disk, according as circumstances may require and as hereinafter explained.

Placed at the inner side of the disk M, and axled upon the sleeve K, is another disk, O, which is provided with flanges at its opposite circumferential edges, and which carries a clamp, P, which is substantially the same as the clamp N, and which is applied to and operated in connection with the disk O in identically the same manner that the clamp N is applied to and operated upon the disk M. The disk O has upon its inner side a beveled pinion, R, which gears into the beveled pinion J at the side of the latter opposite to that which gears with the beveled pinion L.

The operation of the apparatus is as follows: The rotation of the driver-shaft D revolves around the axis of the said driver-shaft all the devices hereinbefore described which are substantially carried by said shaft, except the clamps N and P, the disks M and O running loosely within the clamps.

It is to be understood, of course, that the handles $j$ of the clamps N and P will ordinarily rest against some stationary part of the lathe, so that they will not be carried around by frictional contact with the disks.

By grasping the handles of the clamp N and compressing the said clamp upon the disk M the rotation of said disk M, and consequently of the sleeve K and its attached beveled pinion L, is of course retarded, so that a rotary motion around its own axis is communicated to the beveled pinion J, and thus to the worm I. This latter is thus caused to act upon the worm-wheel H, which, in turn, gives motion to the spur-pinion F, and this latter turns the spur-wheel G, and consequently the head B, with reference to the frame C and the radially-movable jaws A, so that the spiral ribs $a$, acting upon the projections $b$ upon the inner ends of the aforesaid jaws A to give them a radial movement—as, for example, away from the axis of motion—to open the chuck.

It is, of course, to be understood that, inasmuch as the disk O and the beveled pinion R are loose upon the sleeve K and within the clamp P, the aforesaid beveled pinion R does not interfere with the movement or operation just hereinbefore explained.

When it is desired to reverse the movement of the jaws—as, for example, to limit the capacity of the chuck—the handles of the clamp P are grasped to gripe the disk O, whereupon the beveled pinion J is acted upon by the beveled pinion R of the disk O. Inasmuch as the beveled pinion R acts upon the side of the beveled pinion J opposite that which gears with the beveled pinion L, it follows that the rotation of said beveled pinion J, when actuated from the beveled pinion R, is in a direction opposite to that which it receives when actuated upon by the other beveled pinion, L. The motion transmitted to the head B, and consequently to the jaws A, is thus reversed, and the jaws are made to approach instead of recede from each other. The sleeve K, with its attached beveled pinion L and disk M, run loosely upon the shaft D, and the disk M runs loosely within the clamp N. It follows that no impediment is offered to the action of the beveled pinion R in producing, as just explained, the reverse movement of the jaws.

What I claim as my invention is—

1. The worm I and the worm-wheel H, in combination with the head B, frame C, jaws A, gearing for connecting the shaft D of the head B with the aforesaid worm I, and gearing for connecting the worm-wheel H with the aforesaid head B, all substantially as and for the purpose herein set forth.

2. The combination of the loose disks M O with the head B, frame C, and radial jaws A of a chuck, and mechanism, substantially as described, for transmitting the operation of the disks to the jaws A to open or close the same, all substantially as and for the purpose herein set forth.

3. The combination of the clamps N P, disks M O, head B, frame C, jaws A, and mechanism for communicating the operation of the disks to the jaws A to open or close the same, all substantially as and for the purpose herein set forth.

4. The combination of the disk M, constructed with the sleeve K, provided with the beveled pinion L, the disk O, constructed with the beveled pinion R and placed loose upon the sleeve K aforesaid, the shaft $f$, carrying the beveled pinion J and worm I, the shaft $c$, carrying the worm-wheel H and spur-pinion F, the head B, provided with the spur-wheel G, the frame C, and the radially-movable jaws A, all substantially as and for the purpose herein set forth.

JOHN DOYLE.

Witnesses:
H. F. PARKER,
R. H. GRIFFIN.